(12) United States Patent
Chowdhury et al.

(10) Patent No.: US 11,210,440 B1
(45) Date of Patent: Dec. 28, 2021

(54) SYSTEMS AND METHODS FOR RLGC EXTRACTION BASED ON PARALLELIZED LEFT-LOOKING INCOMPLETE INVERSE FAST MULTIPOLE OPERATIONS

(71) Applicant: ANSYS, INC., Canonsburg, PA (US)

(72) Inventors: Indranil Chowdhury, Pittsburgh, PA (US); David Fernandez Becerra, Pittsburgh, PA (US)

(73) Assignee: ANSYS, INC., Canonsburg, PA (US)

( * ) Notice: Subject to any disclaimer, the term of this patent is extended or adjusted under 35 U.S.C. 154(b) by 245 days.

(21) Appl. No.: 16/657,650

(22) Filed: Oct. 18, 2019

Related U.S. Application Data

(60) Provisional application No. 62/841,671, filed on May 1, 2019.

(51) Int. Cl.
*G06F 30/20* (2020.01)
*G06F 16/901* (2019.01)
*G06F 17/16* (2006.01)

(52) U.S. Cl.
CPC .......... *G06F 30/20* (2020.01); *G06F 16/9024* (2019.01); *G06F 16/9027* (2019.01); *G06F 17/16* (2013.01)

(58) Field of Classification Search
None
See application file for complete search history.

(56) References Cited

U.S. PATENT DOCUMENTS

2010/0327280 A1* 12/2010 Joseph .............. H01L 21/76224
257/51

* cited by examiner

*Primary Examiner* — Craig C Dorais
(74) *Attorney, Agent, or Firm* — Womble Bond Dickinson (US) LLP

(57) ABSTRACT

Machine assisted systems and methods for use in a solver are described. These systems and methods can use the solver to perform a setup phase, based on left-looking incomplete inverse fast multipole (LL-IFMM) operation on matrix A, and perform a solve phase for calculating a matrix-vector product for the matrix A based on a forward and backward substitution (FBS) method. The parallelization of the setup phase and the solve phase based on an elimination tree method. The parallelization of the setup phase and the solve phase being implemented using hybrid scheduling. The solver, once implemented, can provide timely solutions for ill-conditioned problems, such as circuits with thin conductors. The solver can also enhance a parasitic extractor accuracy when solving problems with a very large number of right-hand sides (RHS).

23 Claims, 16 Drawing Sheets

FIG. 6

| | P2 | M2 | P1 | M1 | P3 | M3 | L2 | L1 | L3 |
|---|---|---|---|---|---|---|---|---|---|
| Q2 | ▨ | ▨ | ▨ | ▨ | ▨ | ▨ | ▨ | ▨ | ▨ |
| L2 | ▨ | ▨ | ▨ | ▨ | ▨ | ▨ | ▨ | ▨ | ▨ |
| Q1 | ▨ | ▨ | Q2P_11 | Q2M_1 | Q2P_31 | | | | |
| L1 | ▨ | ▨ | L2P_1 | | | | | -1 | |
| Q3 | ▨ | ▨ | Q2P_13 | | Q2P_33 | Q2M_3 | | | -1 |
| L3 | ▨ | ▨ | | | L2P_3 | | | | -1 |
| M2 | ▨ | ▨ | | | | | | | |
| M1 | ▨ | ▨ | | -1 | | | | 0 | |
| M3 | ▨ | ▨ | | | | -1 | | 0 | |

800 (table), 802 (shaded block), 804 (cell Q2P_31), 806 (shaded column)

| | | Q1 | | L1 | | Q3 | | L3 | | M2 | | M1 | | M3 | |
|---|---|---|---|---|---|---|---|---|---|---|---|---|---|---|---|
| Q2 | L2 | Q2P_11 | Q2M_1_updated | L2P_1_updated | 0 | Q2P_33 | Q2M_3 | L2P_3 | | | | M2P_31 | | | |
| | | 0 | | | | | Q2L_13 | | -1 | | | -1 | | -1 | |
| | | | | -1 | | | | -1 | | | | | | 0 | |
| | | | | | | | | | | | | | | | |

| P2 | M2 | P1 | M1 | P3 | M3 | L2 | L1 | L3 |

FIG. 7

| | Q2 | L2 | Q1 | L1 | Q3 | L3 | M2 | M1 | M3 |
|---|---|---|---|---|---|---|---|---|---|
| P2 | | | | | Q2P_33 | L2P_3_updated | | | |
| M2 | | | | | Q2M_3_updated | | | | |
| P1 | | | | | | | | 0 | -1 |
| M1 | | | | | 0 | -1 | | | |
| P3 | | | | | | | | | |
| M3 | | | | | | | | | |
| L2 | | | | | | | | M2L_31 | M2L_13 |
| L1 | | | | | | | | | |
| L3 | | | | | | | | | |

FIG. 9

SYSTEMS AND METHODS FOR RLGC EXTRACTION BASED ON PARALLELIZED LEFT-LOOKING INCOMPLETE INVERSE FAST MULTIPOLE OPERATIONS

This application claims the benefit of the filing date of U.S. provisional patent application No. 62/841,671, filed May 1, 2019 and entitled Systems And Methods For RLGC Extraction Based On Parallelized Left-looking Incomplete Inverse Fast Multipole Operations, and this provisional patent application is hereby incorporated herein by reference.

BACKGROUND

The design and testing of modern integrated circuits (ICs) is a complicated and expensive process. Such ICs can have millions of components such as transistors connected together in a circuit pattern or topology. Circuit designers understand that certain circuit patterns are more prone to reliability problems such as electrostatic discharge, electrical overstress, and aging because of the structure of the connections between devices and the usage, for example, voltage and current levels of the devices and physical parameters of the devices. These reliability problems can be related to various physical phenomena such as over voltage, for example, excessive voltage at a junction, high current through a junction or channel, and incorrect bias on a device. Circuit designers will usually attempt to avoid creating unreliable circuit patterns, and modern circuit design tools such as computer aided design software tools can help to avoid or detect unreliable circuit patterns. However, identifying such circuit patterns is a difficult task for a circuit netlist containing one million or more devices. Some circuit design software tools can perform simulations on a circuit netlist to determine whether the circuit netlist includes a circuit pattern that appears to be unreliable.

These simulations are limited by long run times and by the inability to simulate large circuits and the inability to simulate all input vector scenarios. Thus, a circuit can be designed, tested and then fabricated in hardware, such as a silicon IC, only to discover that it is unreliable due to one or more circuit patterns that prove to be unreliable.

Designers of modern electronic devices face many challenges for making their products work. Electronic devices are now highly miniaturized, leading to unintended electrical coupling effects that can degrade product performance. These devices also operate at high speed, making these devices potentially vulnerable to a variety of signal and power integrity issues. To cope with this, designers require computer-aided analysis tools that can predict these effects. A commonly used approach in such tools is to analyze the 3-D electromagnetic fields in the design and represent the 3-D electromagnetic fields as a set of "parasitic" circuit elements. The circuit designer then incorporates these extracted RLGC parasitics into circuit simulations to model the performance of his device.

The MoM technique is a popular method for parasitic extraction of large geometries like packages, touch-panels and various sensors. Available tools such as Fastcap and ANSYS Q3D use iterative methods for solving the large systems of equations arising from the method of Moments (MoM) integral equations. Fast iterative solvers have been successfully used for a large number of complicated geometries. However, fast iterative solvers perform poorly for many important classes of problems. The first class is ill-conditioned problems—this happens when the geometry consists of thin conductors, tiny elements or resonating structures. In such cases the iterative solver experiences poor convergence so that the results are inaccurate. The second class is problems with many nets—in such cases a large number of right-hand sides (RHS) must be solved and as such the solution time can be very long. Simulation times for most packages or touch panels are long. Block-diagonal or loop-tree preconditioning methods work well in many cases, but are less effective for extreme geometries.

Direct solvers operate differently. First, an LU factorization is computed. Then forward- and backward substitution (FBS) is used to compute the solution for each right-hand side (RHS). This FBS solution time is faster than solving via an iterative method. Hence, a good direct solver can be very beneficial for problems with many right-hand sides (RHS). A direct solver can have a large setup time for the LU decomposition, and yet its faster FBS solution time can accelerate the solution process significantly. Also, direct solvers do not suffer slow-downs for ill-conditioned problems.

Commercially available RLGC extractor (Q3D) lacked effective preconditioners for thin-conductor geometries, resonating structures or multiscale meshes. Packages and touch panels often have very high aspect ratios and tiny features which require rigorous electromagnetic characterization.

Most multiport problems require handling of large numbers of right-hand sides (RHS) which require large solution time when iterative methods, such as Generalized minimal residual method (GMRES) or Transpose-free quasi-minimal residual method (TFQMR) are used. The problem gets even worse when the structure is ill-conditioned.

Different integral equation solvers, such as conjugate gradient (CG), RL, Poggio-Miller-ChangHarrington-Wu-Tsai formulation (PMCHWT) require specialized preconditioning technologies, such as block-diagonal for electro-quasi-static and loop-tree for magneto-quasi-static. However, such preconditioning technologies are less effective for extreme geometries.

SUMMARY OF THE DESCRIPTION

Machine assisted systems and methods for use in a solver are described. These systems and methods can use the solver to perform a setup phase, based on left-looking incomplete inverse fast multipole (LL-IFMM) operation on matrix A, and solve phase to calculate a matrix-vector product for the matrix A based on a forward and backward substitution (FBS) method. The parallelization of the setup phase and the solve phase can be based on elimination tree method. The parallelization of the setup phase and the solve phase can be implemented using hybrid scheduling. The solver, once implemented, can provide timely solutions for ill-conditioned problems, such as circuits with thin conductors. The solver also enhances the parasitic extractor accuracy when solving problems with a very large number of right-hand sides (RHS).

A method according to one embodiment described herein can include the following operations: performing a setup phase, by the solver, based on left-looking incomplete inverse fast multipole (LL-IFMM) operation on matrix A, the matrix A representing a simulated physical system; and calculating the matrix-vector product for the matrix A, by the solver, based on forward and backward substitution (FBS) method, the calculation of the matrix-vector product defining a solve phase. In one embodiment, the left-looking incomplete inverse fast multipole (LL-IFMM) operation can include the operation of: preparing the matrix A in a predefined FMM hierarchical structure; for each of a plurality of FMM boxes at a predefined level in the FMM hierarchical structure, receiving a Schur complement from one or more factorized near-field FMM boxes, the receiving of the Schur complement generating a plurality of near-field fill-in blocks and a plurality of far-field fill-in blocks; compressing the plurality of far-field fill-in blocks and storing the plurality of far-field fill-in blocks to one or more predefined locations in the FMM hierarchical structure; updating a plurality of FMM operators associated with each of the plurality of FMM boxes and one or more far-field FMM boxes; storing the plurality of near-field fill-in blocks as a plurality of off-diagonal LU blocks; determining L factor and U factor based on LU factorization algorithm for each of the plurality of FMM boxes; and updating Schur complements for each of the plurality of FMM boxes belonging to a next predefined level in the FMM hierarchical structure once all of the plurality of FMM boxes at the predefined level in the FMM hierarchical structure have been processed.

In one embodiment, the generated far-field fill-in blocks can include (i) first type being formed between one or more eliminated FMM boxes and one or more FMM pivot boxes, and (ii) second type being formed between one or more non-eliminated FMM boxes and the one or more FMM pivot boxes. In one embodiment, a memory allocation for each of the plurality of FMM boxes is no more than two mallocs, the mallocs being used to store near-field factors and far-field operators, thereby reducing processing speed and resource requirements. In one embodiment, the update of each of the plurality of FMM operators can include a single update.

In one embodiment, a parallelization of the setup phase and the solve phase can be based at least in part on an elimination tree method. The elimination tree method can include the operation of: defining an adjacency graph for a current level; and performing nested-dissection of the adjacency graph based at least on graph partitioning algorithm to generate bi-partitioned tree for the current level, the generated bi-partitioned defining an elimination tree for the current level. In one embodiment, the parallelization of the setup phase and the solve phase can be implemented using hybrid scheduling, the hybrid scheduling can include (i) a static scheduling and a dynamic scheduling, and (ii) a dynamic scheduling. In one embodiment, the static scheduling can include one or more supernode tasks and one or more subtree tasks, the one or more supernode tasks and the one or more subtree tasks being organized based on the elimination tree method.

The aspects and embodiments described herein can include non-transitory machine readable media that store executable computer program instructions that when executed can cause one or more data processing systems to perform the methods described herein when the computer program instructions are executed by the one or more data processing systems. The instructions can be stored in non-volatile memory such as flash memory or dynamic random access memory which is volatile, or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 6 shows a schematic diagram illustrating a matrix representing Factorize_Box step of box1 in factorization steps according to one embodiment.

FIG. 7 shows a schematic diagram illustrating a resulting matrix in after a single factorization step according to one embodiment.

FIG. 9 shows a schematic diagram illustrating a resulting matrix in factorization steps according to one embodiment.

DETAILED DESCRIPTION

Figure 1:
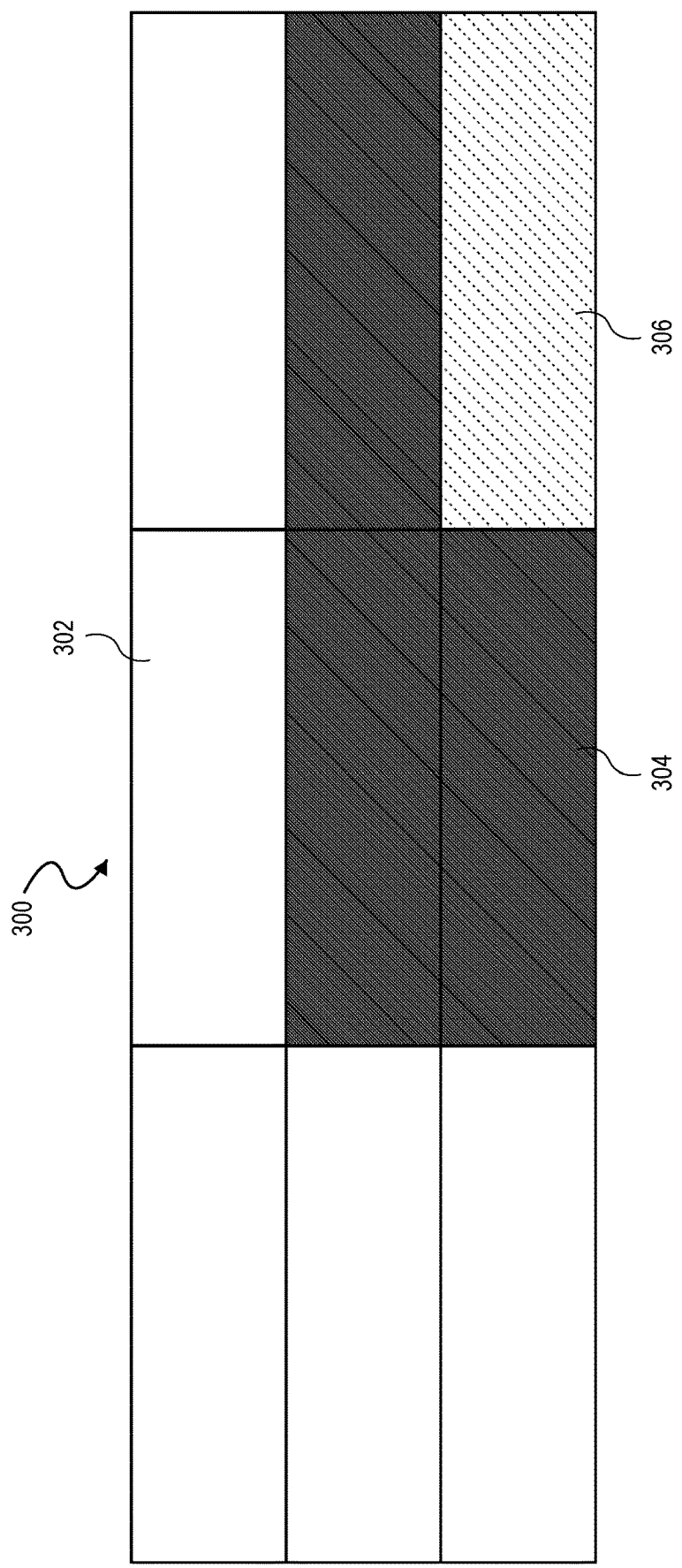
FIG. 1 is a schematic diagram illustrating LU factorization for a three by three matrix according to one embodiment.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can use Left-looking Incomplete Inverse Fast Multipole (LL-IFMM) method which can be an error-controllable inverse transformation of the FMM-represented physical system which enables the RLGC or also known as parasitic extractors to provide timely solutions for ill-conditioned problems, such as circuits with thin conductors. Further, the embodiments described herein allow for more effective extraction of parasitic parameters for badly conditioned problems arising in electronic circuits such as touch screen panels. The LL-IFMM method also enhances the parasitic extractors accuracy when solving problems with a very large number of right-hand sides (RHS). Hence this approach can improve the parasitic extractors solution accuracy and time for ill-conditioned problems. The method described herein allows application of an approximate direct solver, either as a better preconditioner for an iterative solver, or to eliminate the iterative solver altogether. The method described herein also allows the direct solver to organize calculations in such a way that the calculations can be effectively carried out with good parallelism on a computer.

Method of Moments (MoM)

The application of this method can be in the large-scale boundary element method (BEM) or Method of Moments (MoM) for quasi-static extraction of RLGC circuit parameters. Although this method can be used to extract RLGC parameters, only the capacitance solution is described here. The electrostatic equation is given by $$\nabla^2 \varphi = -\rho(r)/\varepsilon \quad (1)$$

where $\varphi$ being the potential, $\rho$ being the charge density, and e being the permittivity of the dielectric.

Discretizing the integral equation obtained from (1), and then applying the Dirichlet and Neumann boundary conditions results in a N×N matrix system of the form $$Zq = V \quad (2)$$

where Z being a dense Green's function matrix, q being the unknown basis functions for charge density, and V being the potential excitations.

Each element in the MoM matrix denotes the interaction between a source and a receiver mesh element given by $$Z(i, j) = \int_{S_i} dst_i(r) \int_{S_j} ds' g(r, r') f_j(r') \quad (3)$$

where $t_i$ being the testing function defined over receiver element $S_i$, $f_j$ being the basis function over source element $S_j$, and g(r,r') being the Green's function. The right-hand side (RHS) includes a voltage excitation for each net, and hence (2) needs to be solved for all the nets.

Fast Multipole Method (FMM) and LU Factorization Algorithms

Figure 2:
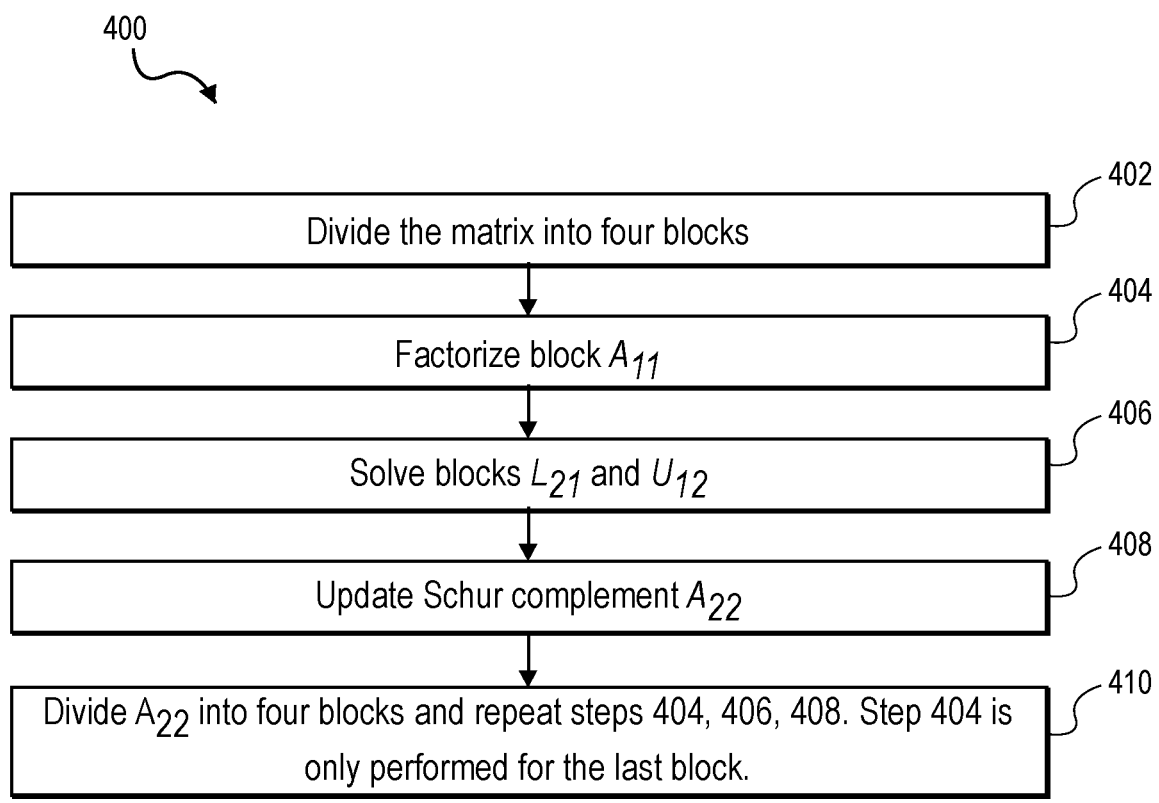
FIG. 2 shows a flow chart which illustrates an LU factorization algorithm according to one embodiment.

As illustrated in FIG. 2, an LU factorization algorithm 400 of the three by three matrix A 300 can include the following steps:
  i. Divide 402 the matrix A 100 into four blocks $A_{11}$, $A_{12}$, $A_{21}$, $A_{22}$.
  ii. Factorize 404 block $A_{11} = L_{11} U_{11}$.
  iii. Solve 406 blocks $L_{21} = A_{12} U^{-1}_{11}$ and $U_{12} = L^{-1}_{11} A_{12}$
  iv. Update 408 a Schur complement $A_{22} = A_{22} - L_{21} U_{12}$
  v. Divide 410 $A_{22}$ into four blocks and repeat steps (ii), (iii), and (iv) in the above algorithm. Step (ii) is only performed for the last block.

FIG. 1 shows an example of an LU factorization for a three by three matrix A 300. The white blocks 302 of the three by three matrix A 300 can fully be eliminated, and the black blocks 304 are currently being factorized. In a right-looking approach, the factors will be formed in the black blocks 304 part and the formed factors will be then used to Schur-update the leftover dot-filled block 306 part. In a left-looking approach, on the other hand, the black blocks 304 part receives Schur updates from the white blocks 302 part first, and then the factors can be formed. The dot-filled block 306 part remains untouched while the black blocks 304 part is being processed.

Referring to FIG. 2, the above sequence of operations can be performed in two ways: (1) Right-looking and (2) Left-looking. In Right-looking, the matrix A 300 can be divided into I=1, . . . , n blocks. For each block k, step (ii) 404 and step (iii) 406 of the LU factorization algorithm 400 can be performed. Then, step (iv) 408 can be performed for the remaining submatrix (i.e., I=k+1, . . . , n). In Left-looking, for example, for each block k, step (iv) 408 can be performed using $L_{21}$ and $U_{12}$ available blocks from 1, . . . , k−1. Then, steps (ii) 404 and (iii) 406 can be performed for block k.

This disclosed mechanism may comprise of the following: (i) A left-looking error-controllable LU method for an FMM compressed system matrix. The memory and solve time can be O(N log^2 N); (ii) Parallelization strategy based on a sparse matrix elimination tree; and (iii) Extraction strategy to tackle a large number of right-hand sides for quasi-static solvers.

Figure 3:
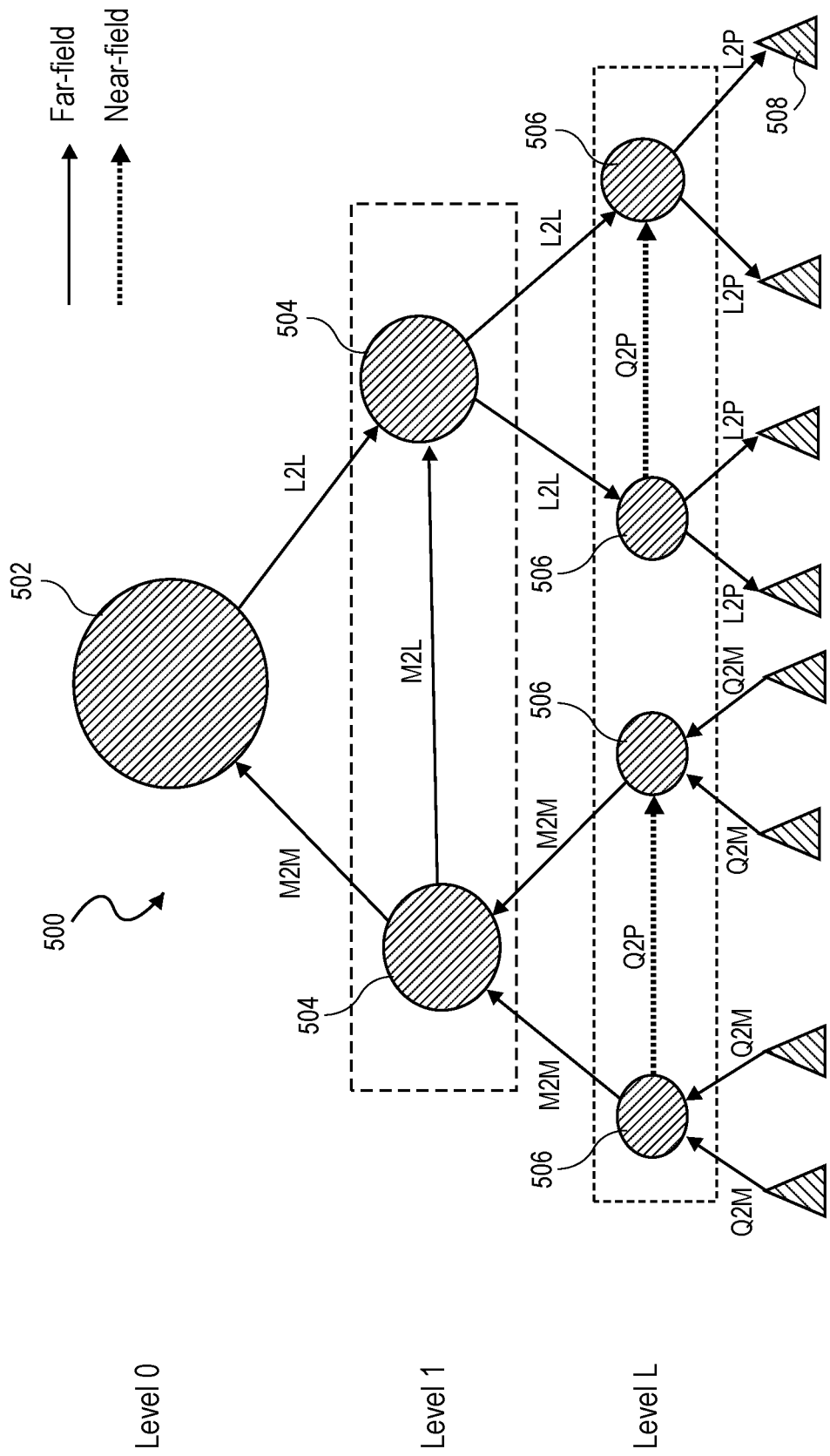
FIG. 3 shows a schematic diagram illustrating Oct-tree operations in Multilevel Fast Multipole method (FMM) according to one embodiment.

For most practical cases, the number of unknown N can be large. FMM can represent a matrix A 300 using O(N) memory, and the resulting matrix-vector product for equation (2) is also O(N). The FMM compressed matrix can be used to accelerate the matrix-vector product time of iterative solvers like Generalized minimal residual method (GMRES). FIG. 3 shows an example of an Oct-tree operations 500 in FMM according to one embodiment. According to an embodiment of the present disclosure, the operations indicated by dashed arrows define near-field operators, and the operations indicated by solid arrows define far-field operators. As further illustrated in FIG. 3, the FMM matrix-vector product algorithm can include the following steps:

(1) Oct-tree Decomposition of the geometry: At level 0, a given mesh can be enclosed in a box. This box can be split into eight children boxes at level 1. Each box can then be recursively split to form the child levels till we reach level L. Each box in this Oct-tree can contain a neighbor-list and an interaction-list. The neighbor-list of a box consists of its neighbor boxes. The interaction-list (or far-field) of a box include the children of its parent's neighbors excluding the box's neighbor-list.

(2) Q2P (near-field) operation: This operation occurs at the finest level. Here the interaction with the neighbor boxes can be computed directly.

(3) Q2M (charge-to-multipole) operation: This operation occurs at the finest level, where the multipole expansions of the resident elements can be formed (i.e., the charges within the same box) at the center of each box.

(4) M2M (multipole-to-multipole) operation: The multipole expansions can be shifted upwards from all the children centers to the parent center.

(5) M2L (multipole-to-local) operation: The multipole expansion of each box can be translated to the centers of all the boxes in its interaction list. This operation occurs within the same level.

(6) L2L (local-to-local) operation: The local expansion of each box can be shifted downwards from the parent box to the children boxes.

(7) L2P (local-to-potential) operation: At the finest level, the local expansion of each box can be converted to potentials of its resident elements. This completes the matrix-vector product.

Optionally, Q2L and M2P operators can also be constructed. For example, a Q2L operator can be constructed by a Q2M operation followed by a M2L operation. In other words, Q2L=M2L Q2M. Similarly, a M2P operator can be constructed by a M2L operation followed by a L2P operation. In other words, M2P=L2P·M2L.

The above algorithms can be used to implement direct solvers for sparse matrix systems.

LU Factorization of FMM Matrix

According to an embodiment of the present disclosure, the potential equations for each box at the finest level L, can be written represented by equation (4) and equation (5) as follows:

$$Q2P \cdot q + L2P \cdot l = P \quad (4)$$

$$Q2M \cdot q - I \cdot m = 0 \quad (5)$$

where q being the charge, l being the local vector, m being the multipole vector, and I being the identity matrix.

At the higher levels, the following equations can be written:

$$M2L \cdot m + L2L \cdot l = l \quad (6)$$

$$M2M \cdot m - I \cdot m = 0 \quad (7)$$

Figure 4:
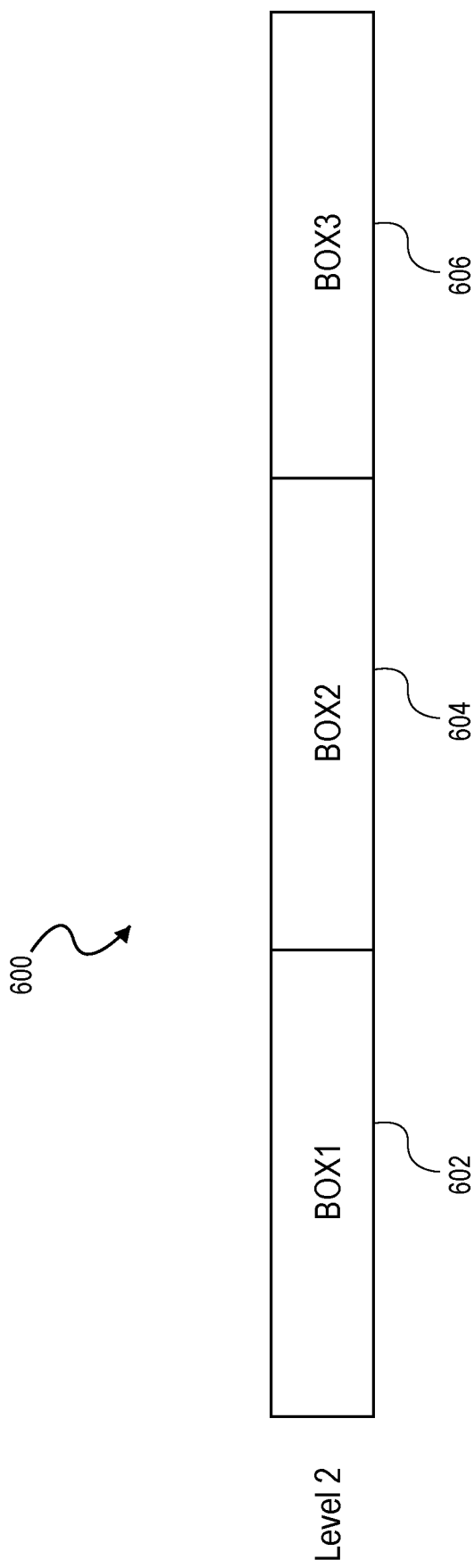
FIG. 4 shows a schematic diagram illustrating FMM tree having two levels with three FMM boxes according to one embodiment.
Figure 5:
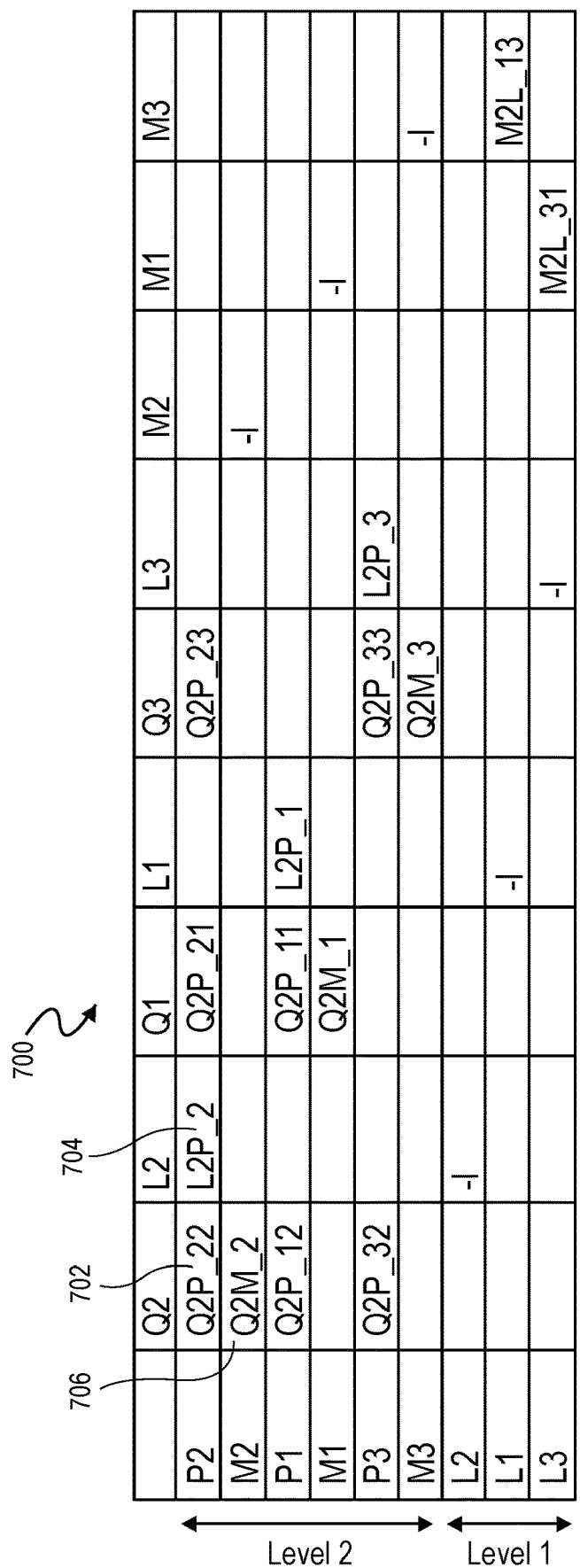
FIG. 5 shows a schematic diagram illustrating a matrix representing sparse matrix equations in factorization steps according to one embodiment.

A sparse matrix block can be formed by the system of equations (4)-(7). Referring to FIG. 4 and FIG. 5, an embodiment of an FMM tree can include two levels. In one embodiment, level 2 can include three boxes 600 as shown in FIG. 4. Box1 602 and box3 603 can be far-field boxes in interaction lists. Box2 604 can be in a neighbor list of box1 602 and box3 606.

As illustrated in FIG. 4, applying equations (4) and (5), box2 604 at level 2 can be represented by the system of equations (4)-(5) as follows:

$$Q2P_{22} \cdot q2 + L2P_2 \cdot l2 + Q2P_{21} \cdot q1 + Q2P_{23} \cdot q3 = P2$$

$$Q2M_2 \cdot q2 - I \cdot m2 = 0$$

Applying equations (4) and (5) again, box1 602 at level 2 can be represented by the system of equations (4)-(5) as follows:

$$Q2P_{12} \cdot q2 + Q2P_{11} \cdot q1 + L2P_1 \cdot l1 = P1$$

$$Q2M_1 \cdot q1 - I \cdot m1 = 0$$

Further, applying equations (4) and (5) again, box3 606 at level 2 can be represented by the system of equations (4)-(5) as follows:

$$Q2P_{32} \cdot q2 + Q2P_{33} \cdot q3 + L2P_3 \cdot l3 = P3$$

$$Q2M_3 \cdot q3 - I \cdot m3 = 0$$

For completing the system of equations (6) and (7), the M2L interactions can be given by the equations that belong at FMM_level 1:

$$M2L_{13} \cdot m3 - l1 = 0_{(M2L\ contribution\ to\ box1\ 602\ from\ box3\ 606)}$$

$$M2L_{31} \cdot m1 - l3 = 0_{(M2L\ contribution\ to\ box3\ 606\ from\ box1\ 602)}$$

$$-l2 = 0_{(box2\ 604\ receives\ no\ M2L\ contributions)}$$

In one embodiment, the matrix system can be solved using a regular sparse direct solver (like PARDISO), but a regular sparse direct solver can produce too many fill-ins.

Fill-in blocks can be generated when a zero element in the original sparse matrix turns into a non-zero element in the factorized matrix. Therefore, solving large test cases can become prohibitively expensive. In one embodiment, LL-IFMM can solve the problem of solving large test cases by using the following properties:

i. A far-field fill-in block produced by the elimination of equations (4) and (5) always occurs within the interaction list.

ii. The far-field fill-in blocks is always low-rank in nature. These far-field fill-in blocks can be compressed and added to the far-field operators, namely M2L, Q2L, and M2P.

iii. The Schur updates received by equations (6) and (7) can facilitate to reform the structure of equations (4) and (5) at the higher level. The higher level can be then factorized by repeating step (i) and step (ii). Further, at the higher level, the m vector of the children become the q vector, while the l vector of the children becomes the P vector.

Left Looking Incomplete Inverse FMM (LL-IFMM)

In one embodiment, the factorization (setup phase) step of each level may include factorizing all the boxes belonging to this level and then, updating the Schur complement for the next level. The next level can also be known as the parent level. In other words, for each box, the left looking factorization can be performed for equations (4)-(5). The Schur complement update can be performed for equations (6)-(7) using the factors formed in equations (4)-(5) for this level. The Schur complement part acts as the equations (4)-(5) in the parent level. In other words, equations (6)-(7) in the child level act as equations (4)-(5) in the parent level. This process can be repeated for level 1. In one embodiment, the main body of the LL-IFMM algorithm can be implemented using the following pseudocode.

```
Function Factorize(tolerance, max_rank)
    For Level = L . . . 2
        For Box = First . . . Last box of Level
            Factorize_Box(tolerance, max_rank)
            UpdateExistingM2Ls
            UpdateNearFieldForTheNextUpperLevel
            ReleaseTheFarFieldMemoryOfThisLevel //clear all the
                far-field
                //blocks
        End For
    Factorize the matrix at Level 1 //Call this the LevelOne-
    Matrix
END Function
```

Figure 11:
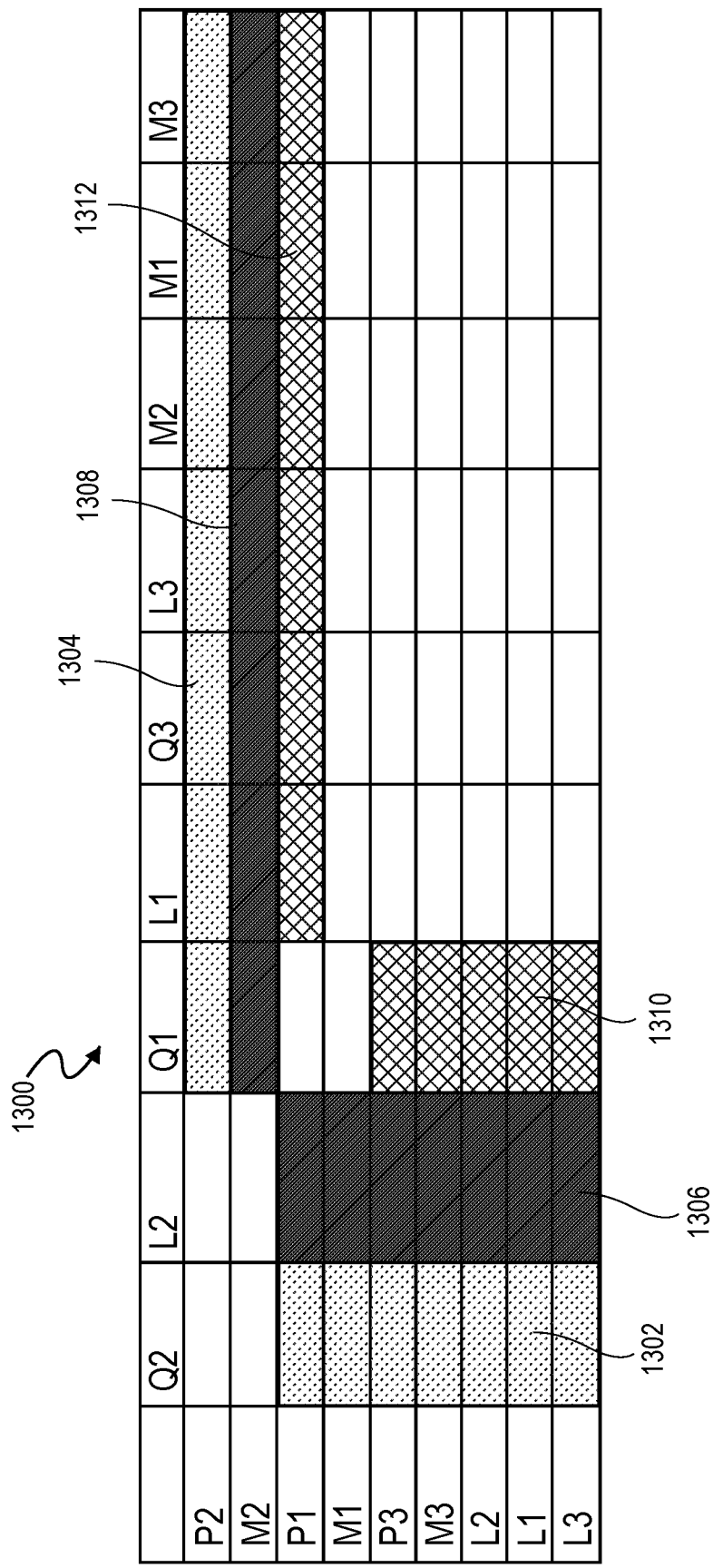
FIG. 11 shows a schematic diagram illustrating exemplary factor parts A11 and A21 as stored according to one embodiment.

In the embodiment of Factorize_Box function, unfactorized or also known as original blocks of the equations (4)-(5) for each of box can be assembled. Then, the Schur complement from the eliminated near-field boxes can be collected. The step of collecting the Schur complement from the eliminated near-field boxes corresponds to the step (iv) in the LU factorization algorithm 400 as shown in FIG. 2. As a result of implementing the step (iv) in the LU factorization algorithm 400, fill-in blocks in the near-field and the far-field (the interaction-list) of this box can be generated. The near-field blocks can be retained, while the far-field blocks can be compressed and the far-field blocks can be stored to appropriate far-field locations. Then, steps (ii) 404 and (iii) 406 of the LU factorization algorithm 400 can be performed forming the L and U factors for this box. Optionally, the factorized form $$\begin{bmatrix} I & 0 \\ A21 \cdot A11^{-1} & I \end{bmatrix} \begin{bmatrix} A11 & A12 \\ 0 & Schur \end{bmatrix}$$

can be used to store the matrix. In one embodiment, the Schur complement for each box (i.e., Schur update for $A_{21}$ and $A_{12}$ blocks) can be collected. Then, only $A_{11}$ block can be inverted and the blocks $A_{12}$, $A_{21}$ and $A_{11}^{-1}$ can be stored for each box. The last Schur block may not be processed or stored for this box. Only blocks $A_{12}$, $A_{21}$ and $A_{11}^{-1}$ can be stored. This reduces the memory requirement for the factors as shown in FIG. 11. In one embodiment, the Factorize_Box function can be implemented using the following pseudocode.

Function Factorize_Box(tolerance, max_rank) //this is the pivotBox
    CollectUnfactorizedA12 //assemble the original entries of the sparse matrix
    CollectSchurUpdatesForA12 //apply left-looking Schur update
    CollectUnfactorizedA21 //assemble the original entries of the sparse matrix
    CollectSchurUpdatesForA21 //apply left-looking Schur update
    CompressA12FarFieldFillins(tolerance,max_rank) //The L2P for this_box gets updated
    CompressA21FarFieldFillins (tolerance,max_rank)//The Q2M for this_box gets updated
    //At this point the rank of this_box has been determined
    // Allocate the Far-field matrices from this_box to unfactorized interaction_list
    SendToFarA12 //Store the corresponding far-field M2P/M2L blocks for this_box
    SendToFarA21 //Store the corresponding far-field Q2L/M2L blocks for this_box
    //The near-field blocks are retained
    RetainA12 //A12 has numberOfRows = numberOfResidentCharges
    RetainA21 //A21 has numberOfColumns = numOfResidentCharges
    FactorizeA11 //This is the self-matrix of size numOfResidentCharges+rank
END Function In one embodiment, the M2P and Q2L blocks in Factorize_Box function can be stored for far-field box. Thus, the M2P and Q2L blocks can be incorporated while factorizing the corresponding far-field box. The original near-field blocks as well as the M2P and Q2L blocks which were stored while eliminating any prior far-field box can be collected in the CollectUnfactorizedA12 and CollectUnfactorizedA21 functions.

In one embodiment, the CollectunfactorizedA12 and CollectUnfactorizedA21 functions can be implemented using the following pseudocode.

Function CollectUnfactorizedA12
    Loop over all unfactorized near-field source matrices and assemble Q2P blocks
    Loop over all factorized interaction-list boxes and assemble stored M2P blocks
End Function
Function CollectUnfactorizedA21
    Loop over all unfactorized near-field receiver matrices and assemble Q2P blocks
    Loop over all factorized interaction-list boxes and assemble stored Q2L blocks
End Function In one embodiment, the CollectSchurUpdatesForA12 and CollectSchurUpdatesForA21 functions can generate fill-in blocks. Schur updates can be received by the pivot box only from the already factorized near-field boxes associated with that pivot box. Further, Schur updates can be received by $A_{11}$, $A_{12}$ and $A_{21}$ blocks from the near boxes. While collecting the Schur updates, fill-in blocks can be created. The near-field fill-in blocks can be stored as the factors. The far-field blocks can be compressed and stored. In one embodiment, the CollectSchurUpdatesForA12 and CollectSchurUpdatesForA21 functions can be implemented using the following pseudocode.

Function CollectSchurUpdatesForA12
    //Loop over all factorized boxes in the near-field
    For lBox=1 . . . all_eliminated_near_boxes
    Search the A21 factor-blocks of lBox to find the a21 Q-variable block of pivotBox.
    Compute a21_lbox = a21_lbox*inv(A11_lbox) where A11 is the selfBlock of lBox
    Update the a12 blocks of the pivotBox using a12_pivot_box -= (a21_lbox*a12_lbox)
    End For
End Function
Function CollectSchurUpdatesForA21
    //Loop over all factorized boxes in the near-field
    For lBox=1 . . . all_eliminated_near_boxes
    Search the A12 factor-blocks of lBox to find the a12 Q-variable block of pivotBox.
    Compute a12_lbox = inv(A11_lbox)*a121box where A11 is the selfBlock of lBox
    Update the a21 blocks of the pivotBox using a21_pivot_box -=(a21_lbox*a12_lbox) End For
End Function The CompressFarFieldFillins function can be the key step in LL-IFMM operation and the CompressFarFieldFillins function differentiates LL-IFMM from a regular sparse LU algorithm. In one embodiment, two types of far-field fill-in blocks can be generated while collecting Schur updates from the factorized near-field boxes. The first type of fill-in blocks can be formed between an eliminated box and the pivot box. The second type of fill-in blocks can be formed between a non-eliminated box and the pivot box. In an embodiment, a fill-in block between the non-eliminated and the pivot box can be always a Q2P term. In the $A_{12}$ block, a fill-in block between an eliminated box and the pivot box can be always M2P (i.e., M of the eliminated box to P of the pivot box). In the $A_{21}$ block, a fill-in block between an eliminated box and the pivot box can be Q2L (i.e., Q of the pivot box to L of the eliminated box). Therefore, there can be three types of far-field fill-in blocks, namely Q2P, M2P and Q2L. In one embodiment, $A_{12}$ and $A_{21}$ can be compressed using SVD to form a QR factorization. The 'Q' term will be the new L2P for the $A_{12}$ part, and Q2M for the $A_{21}$ part. In an embodiment, the 'R' term can be of two types. In a case where the fill-in block may be Q2P, the R term will be Q2L in $A_{12}$ and M2P in $A_{21}$. In a case the fill-in block may be M2P or a Q2L, the R term will be M2L term. The Q2L and M2P terms can be stored and can be used in CollectUnfactorizedA12 function and CollectUnfactorizedA21 function while factorizing the corresponding non-eliminated box. The stored M2L terms can be used in the UpdateExistingM2Ls function and UpdateNearFieldForTheNextUpperLevel function. These stored M2L terms appear on top of the existing M2L terms. These stored M2L terms can be called "fill-in M2Ls". The CompressFarFieldFillins function can be implemented using the following pseudocode.

Function CompressA12FarFieldFillins (tolerance, max_rank)
    Collect the far-field blocks from the A12 Schur Update and concatenate with L2P
    Perform SVD using tolerance to obtain the Q * R
    //Q becomes the new L2P matrix.

//Columns of R corresponding to the unfactorized boxes form Q2L terms
//Columns of R corresponding to the factorized boxes form the fill-in M2L terms
//call the columns of R corresponding to the L2P term L2P_R
//For the upper levels L2L matrices serve as L2P blocks
End Function
Function CompressA21FarFieldFillins(tolerance,max_rank)
  Collect the far-field blocks from the A21 Schur Update and concatenate with Q2M
  Perform SVD using tolerance to obtain the R_transpose * Q_transpose
  //Q_transpose becomes the new Q2M matrix.
  //Row of R' corresponding to the unfactorized boxes form M2P terms
  //Rows of R' corresponding to the factorized boxes form the fill-in M2L terms
  //call the columns of R' corresponding to the Q2M term Q2M_R
  //For the upper levels M2Ms serve as Q2M blocks
End Function In an embodiment, the FactorizeA11 function factorizes the $A_{11}$ pivot block using BLAS getrf routine. The FactorizeA11 function can be implemented using the following pseudocode.
FactorizeA11
  Assemble the self-block for equations (4-5) and factorize it
  //This is the A11 block.
  // Notice that for upper levels M2L blocks serve as Q2P
  // At upper levels equations (6-7) replaces equations (4-5).
End Function Because new fill-in M2L terms appear during the factorizing process, these M2Ls can be added to the existing M2Ls using UpdateExistingM2Ls function. In an embodiment, the UpdateExistingM2Ls function can be implemented using the following pseudocode.
Function UpdateExistingM2Ls
  //Loop over all M2Ls of this level
  For m2l=1 . . . all_M2Ls
    Get Q2M_R from source box and L2P_R from receiver box
    Update existing M2L block using L2P_R * m2l * Q2M_R
    Add existing M2L block to the fill-in M2L block
  End For
End Function In one embodiment, only M2L terms remain because all the near-field terms were eliminated for this level. The M2L terms (equations (6)-(7)) can be assembled for each box and the M2L terms receive the Schur updates from the corresponding near-field boxes. The 'M's at this level form the 'Q's, or charges at the parent level, and the 'L's at this level form the 'P's, or potentials at the parent level. These equations (6)-(7) act as the near-field at the parent level since all the M2L interactions at the child level can be contained within the near-field of the parent level.

The UpdateNearFieldForTheNextUpperLevel function can be implemented using the following pseudocode.
Function UpdateNearFieldForTheNextUpperLevel
  //Loop over all near-field boxes of this_box
  For lBox = 1 . . . all_near_boxes
    Search the A21 factor-blocks of lBox to find the a21 L-variable of this_Box.
    Perform a21_lbox=a21_lbox*inv(A11_lbox) where A11 is the self-block of lBox
    Update the Schur blocks of the M-variables connected to this_Box using all_this_block -= (a21_lbox*a12_lbox)
End Function LL-IFMM Factorization Example
FIGS. 4-10 show an example of factorization steps (setup phase) based on the LL-IFMM for a three-box case. For example, FMM tree can include two levels. In an embodiment, level two can contain three boxes as shown in FIG. 4. Box1 602 and box3 606 can be far-field boxes in interaction lists. Box2 604 can be in the neighbor-list of box1 602 and box3 606. Box2 604 will be eliminated first followed by box1 602 and box3 606.

FIG. 5 shows an example of a sparse matrix 400 which represents equations (4)-(7). The M2Ls can be stored separately and may not be included in the Factorize_Box elimination steps. These M2Ls can be defined as 'existing M2Ls'. In an embodiment, the pivot blocks Q2P_22 702, L2P_2 706, and Q2M_2 708 and the pivot blocks Q2P_22 702, L2P_2 704, and Q2M_2 708 can be factorized and stored. Box2 604 can be processed. As a result, box2 604 can be eliminated first. The 'existing M2Ls' can be updated after level 2 has been completely eliminated.

FIG. 6 shows an example of how the Factorize_Box function step can be applied to box1 602. After box2 604 has been eliminated, Schur updates can be collected in box1 602. The black portion 802 can represent the fully-summed part. Left-looking Schur updates can be collected from the near-neighbors. Q2P_31 804 and Q2P_13 806 represent the far-field fill-ins. Near-field fill-ins may not be shown in FIG. 6 because the near-field fill-ins can be stored as factors. Schur updates can be collected and the collecting of Schur updated results in far-field fill-ins Q2P_13 806 and Q2P_31 804. In an embodiment, Schur contributions only come from the neighbor boxes which have already been factorized. Row matrix [Q2P_13 L2P_1] and column matrix [Q2P_31; Q2M_1] can be assembled.

Figure 7:
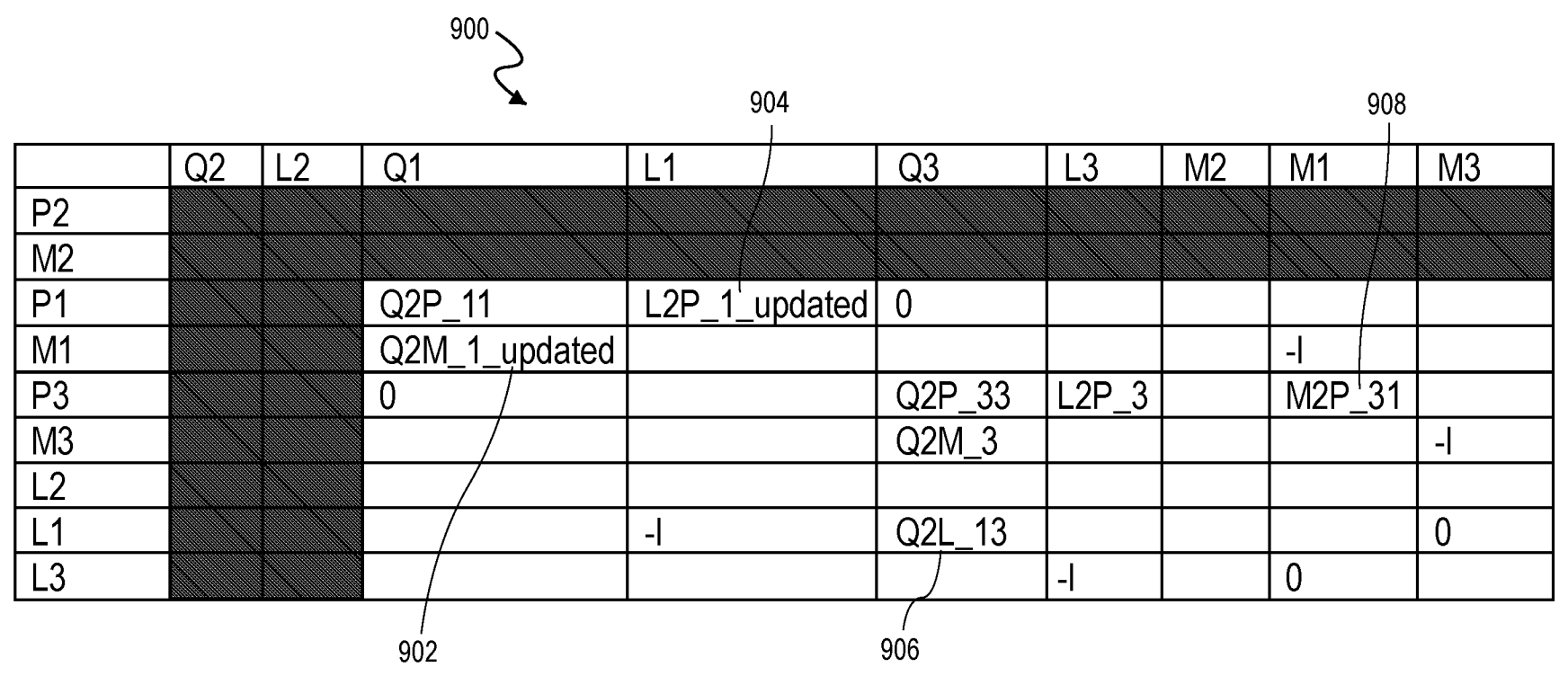

As shown in an example in FIG. 7, CompressFarFieldFillins function can be applied. As a result, the first matrix can be QR compressed into the form [L2P_1_updated]×[Q2L_13 L2P_R_1], and the second matrix can be compressed to [M2P_31; Q2M_R_1]×[Q2M_1_updated]. The resulting matrix 900 can be shown in FIG. 7. As illustrated in FIG. 7, the far-field blocks can be zeroed out and the factorized blocks can be stored in box1 602. For example, after compression of the far-field fill-ins, Q2M_1 902 and L2P_1 904 can be updated. Far-field terms 906, 908 Q2L_13/M2P_31 can be stored in box1 602.

Figure 8:
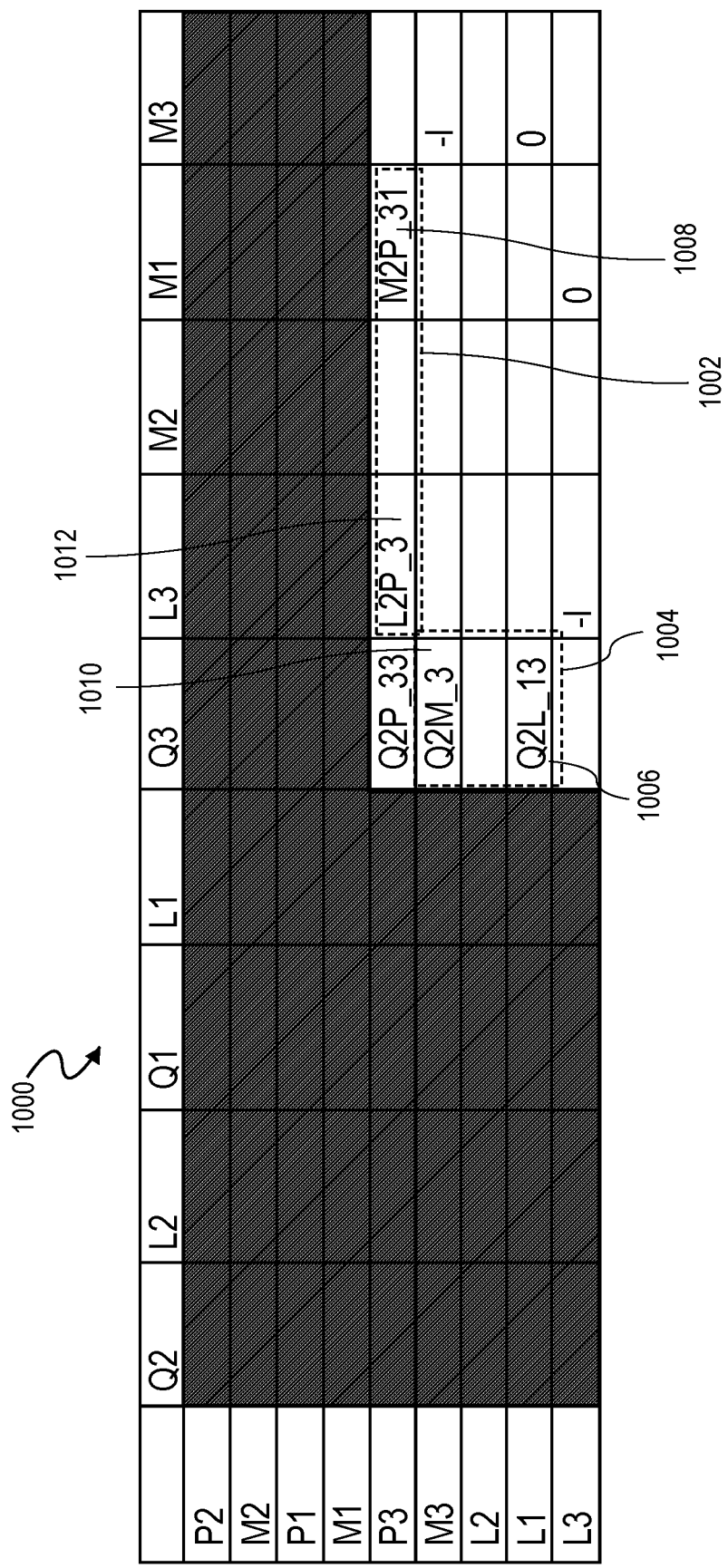
FIG. 8 shows a schematic diagram illustrating a matrix representing Factorize_Box step of box3 in factorization steps according to one embodiment.

FIG. 8 shows an example how Factorize_Box function can be applied to box3 606. In an embodiment, the Schur updates can be collected from the neighbor box26 and the far-field fill-ins in [M2P_31 L2P_3] (row matrix) 1002 and [Q2L_13; Q2M_3](column matrix) 1004 can be assembled. For example, the pivot block and far-field terms M2P_31 1008 and Q2L_13 1006 can be generated after Schur updates can be collected for box3 606.

As shown in FIG. 9, the row matrix 1002 becomes [L2P_3 updated]×[M2L_31 L2P_R_3], and the column matrix 1004 becomes [M2L_13; Q2M_R_3]×[Q2M_3_updated] after the QR compression. Specifically, Q2M_3 1010 and L2P_3 1012 can be updated after the QR compression. M2P_31 1008 can be replaced by M2L_31 1102, Q2L_13 1006 can be replaced by M2L_13 1104. FIG. 9 shows an example of a resulting matrix 1100. In the resulting matrix 1100, resulting M2L terms M2L_31 1102, M2L_13 1104 can be defined as fill-in M2Ls. All the terms can be stored in box3 606, and the pivot block can be factorized. All steps in Factorize_Box function may be complete and all three boxes in level 2 has been factorized.

In an embodiment of UpdateExistingM2Ls function, the existing M2Ls can be updated using M2L_13_existing=L2P_R_1*M2L_13_existing*Q2M_R_3, and
M2L_31_existing=L2P_R_3*M2L_31_existing*Q2M_R_1.
The existing M2Ls can be then added to the fill-in M2Ls.

Figure 10:
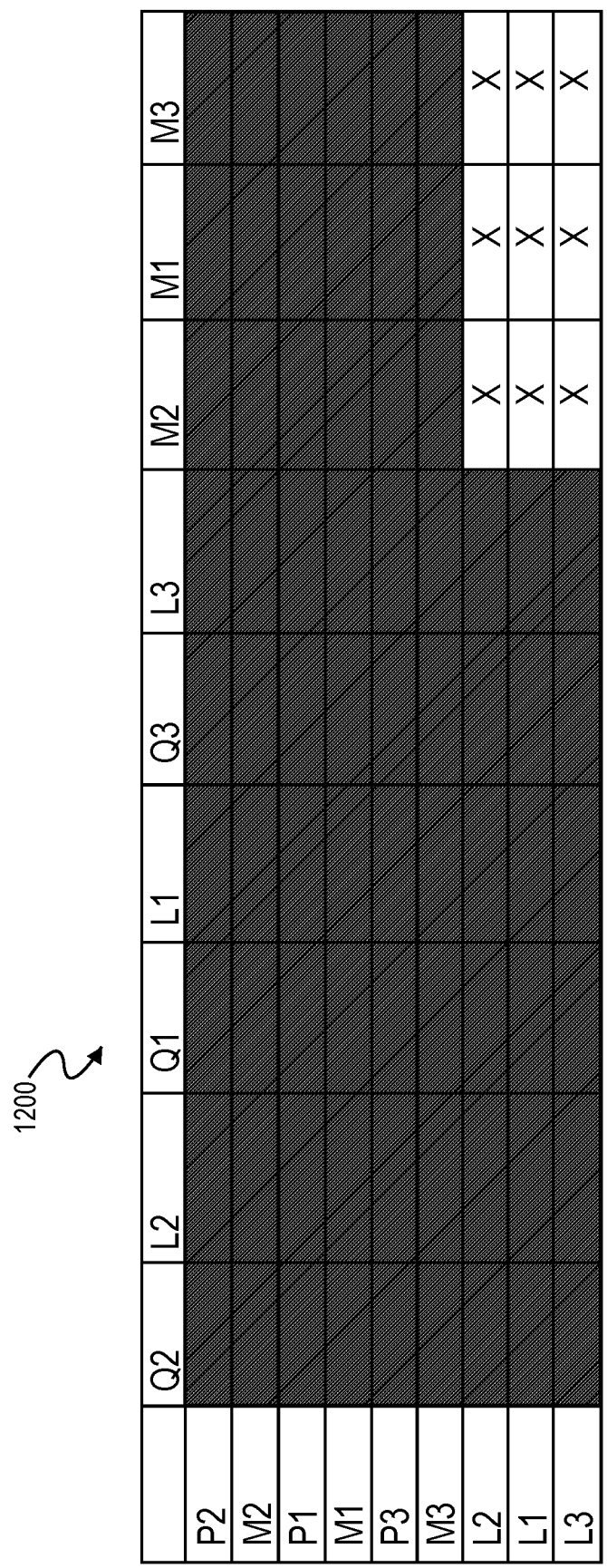
FIG. 10 shows a schematic diagram illustrating a dense matrix in factorization steps according to one embodiment.

In an embodiment of UpdateNearFieldForTheNextUpperLevel function, the Schur updates of the Level 1 boxes can be filled up by looping through the children boxes. Box2 604 receives Schur updates from box1 602 and box3 606. Box1 602 and box3 606 each receives Schur updates from box2 604 only. As a result, a dense matrix 1200 can be generated as shown in FIG. 10. The dense matrix 1200 can be then factorized. Box1 602, box2 604, and box3 606 at level 2 can be fully eliminated. Subsequently, the existing M2Ls shown in FIG. 5 can be updated and the updated existing M2Ls can be added to the fill-in M2Ls as shown in FIG. 9. Schur updates for level 1 can be collected and a single dense matrix can be generated. The last step completes the Factorize function operation.

Solve Phase

In one embodiment, the solve phase includes forward and backward substitutions. The solve phase can be implemented using the following pseudocode.
Function Solve
   For Level = L . . . 2 //this is the upward pass
     For Box = First . . . Last Box of L
       ForwardSolve
     End For
   End For
   Solve LevelOneMatrix
   For Level = 2 . . . L //this is the downward pass
     For Box = Last . . . First Box of L
       BackwardSolve
     End For
   End For
End Function In Solve function, the ForwardSolve function can be applied to the RHS rows which correspond to the row-variables of the $A_{11}$ and $A_{21}$ blocks of each box. The ForwardSolve function can be implemented using the following pseudocode.
Function ForwardSolve
   Get the RHS rows corresponding to the A11 and A21 row-variables
     Compute x = A21 * RHS_11
     Update RHS_21 = RHS_21 - x for all row-variables
End Function In Solve function, the BackwardSolve function can be applied to the RHS rows which correspond to the column-variables of the $A_{11}$ and $A_{12}$ blocks of this box. The BackwardSolve function can be implemented using the following pseudocode.
Function BackwardSolve
   Get the RHS rows corresponding to the A11 and A12 column-variables
     Update RHS_11 = RHS11 - A12 * RHS_12 for all column-variables
     Compute RHS_11 = inv(A11) * RHS11
End Function Center Rule and Volume Rule In an embodiment, surface meshes can be handled within multilevel FMM using two methods. The first method can be Center Rule. In Center Rule, for example, triangles can be assigned to the finest level of the FMM tree based on the location of the centroids. The second method can be Volume Rule in which triangles can be assigned to the higher level boxes if the triangles do not fit inside a child level box. As previously described, the discussed algorithms can be applicable to the Center Rule. The Volume Rule can be applied to the previously discussed algorithm by considering the following:
   (i) No new fill-ins appear during the lower level factorization step because all the neighbor boxes at the lower level can be a subset of the neighbor list at the higher level.
   (ii) The resident triangles of the parent level can be clubbed together with the M variables at the child level, so that the parent level columns can be updated during the factorization of individual boxes.
   (iii) In the UpdateNearFieldForTheNextUpperLevel function step, all the upper level boxes which interact with lower levels need to be updated.

Sparse Data Structures

FIG. 11 illustrates one example how factor parts $A_{11}$ and $A_{21}$ can be stored. The row portions 1304, 1308, 1312 and column portions 1302, 1306, 1310 can represent the factors for box2 604. Only the row portion 1304 indicated in dot-filled blocks and the column portion 1302 indicated in dot-filled blocks can be stored for factors $A_{12}$ and $A_{21}$. The column portion and row portion indicated in black 1306, 1308 may not be stored. During CollectSchurUpdates of box1 602, only the column portion and row portion indicated in crosshatch pattern 1310, 1312 can be updated. The column portion 1310 and row portion 1312 indicated in crosshatch pattern become the stored factors for box1 602. In an embodiment, for each box, (1) near-field factors $A_{11}$, $A_{21}$, $A_{12}$ can be stored, (2) the far-field matrices can be generated during the processing of each box, and (3) one array of pointers pointing to the beginning of each matrix block. The storage of all matrices can be performed according to dense FORTRAN format.

According to an embodiment of the present disclosure, LU factors $L_{21}$ and $U_{12}$ may not be stored. Rather $A_{12}$ and $A_{21}$ can be stored for the factorized matrix $$\begin{bmatrix} I & 0 \\ A21 \cdot A11^{-1} & I \end{bmatrix} \begin{bmatrix} A11 & A12 \\ 0 & Schur \end{bmatrix}.$$

$A_{12}$ has fewer rows than $U_{12}$ and $A_{21}$ has fewer columns than $L_{21}$. For example, the row portion in dot-filled 1304 and the row portion in black 1308 can be stored by the box2 604 $U_{12}$. The row portion in black may not be stored to reduce the memory usage.

Elimination Tree

In an embodiment, an elimination tree, namely e-tree, can be used to build the dependency graph for the sparse matrix factorization. The elimination tree may be different from the oct-tree used in FMM. The elimination tree can be used for a parallelization of the factorization and solve steps. The elimination tree can be constructed using the following steps:
   i. An adjacency graph for this level is defined. All the neighboring and far-field boxes in the adjacency list of a box can be incorporated.
   ii. A graph partitioning algorithm such as METIS or SCOTCH can be used to perform nested-dissection of the adjacency graph. The resulting bi-partitioned tree can be the elimination tree for this level. Each node in the elimination tree includes a few FMM boxes. The elimination tree provides the ordering to be used for eliminating FMM boxes.

Parallelized (Multicore) Sparse Factorization and Solution

Figure 12:
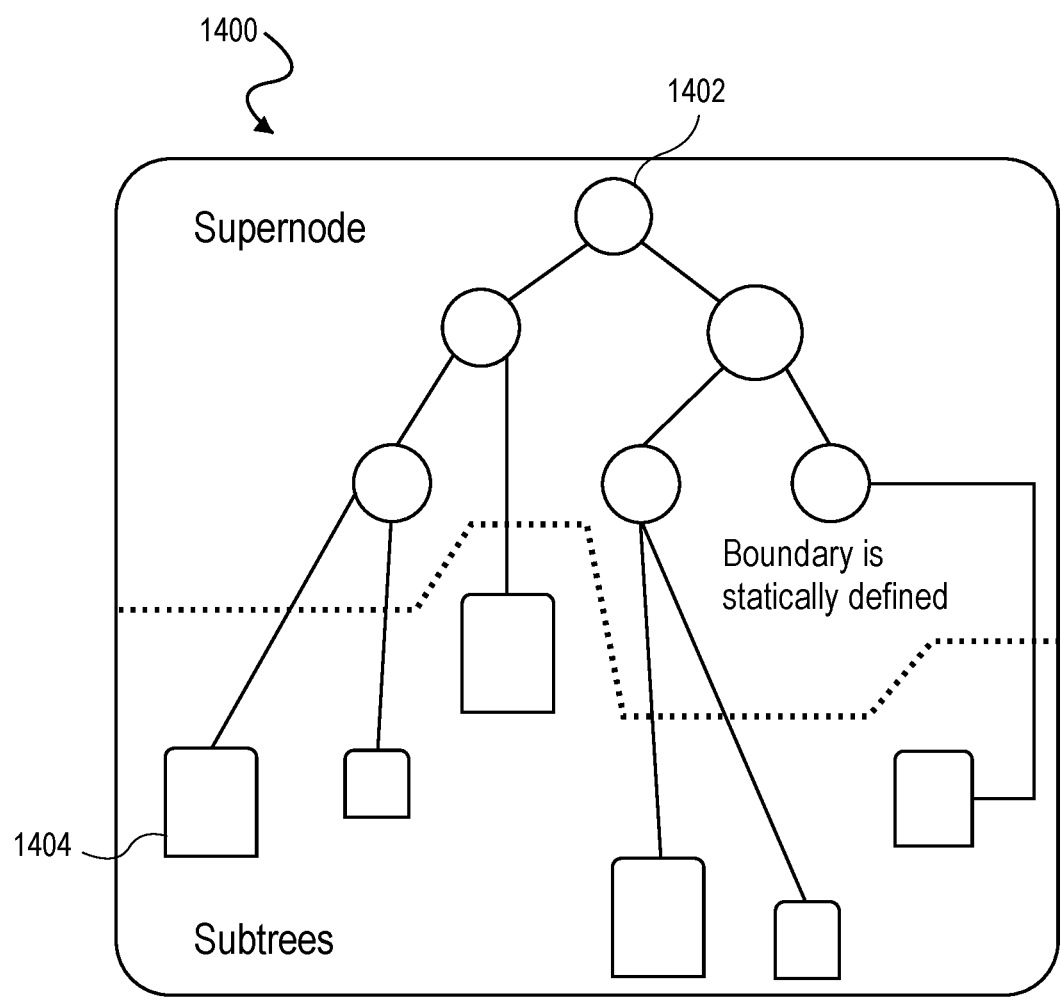
FIG. 12 shows a schematic diagram illustrating subtree and supernode partitions on a sample tree data structure for static scheduling according to one embodiment.

FIG. 12 shows an example of subtree and supernode partitions 1400 on a sample tree data structure for static scheduling. Thread parallelism for the LL-IFMM method described herein can be implemented using a hybrid scheduling technique to balance the thread load across available cores based on the elimination tree structure. As shown in FIG. 12, the parallelism can be obtained by breaking the tasks into two categories, namely supernode 1402 and subtree 1404 tasks defined from the elimination tree structure. Subtree 1404 tasks can be concurrent in nature, and may execute concurrently using separate parallel task queues, thereby reducing resource bottlenecks. Supernode 1402 tasks depend on a set of subtree 1404 tasks, or other children supernode tasks located at the bottom of the tree structure. Supernode 1402 tasks can be scheduled in the task queues as the data dependencies can be satisfied. In other words, supernode 1402 tasks can be scheduled in the task queues as soon as the children tasks can be completed. This task division and dynamic scheduling allow more parallel opportunities to keep the increasing number of cores in modern multicore processors being fully utilized.

According to an embodiment of the present disclosure, task Scheduling occurs in two phases. The first phase includes a static scheduling phase and a dynamic scheduling phase. The static scheduling and the dynamic scheduling define hybrid methodology. The static scheduling phase occurs in a preprocessing step, where the tree structure of tasks can be traversed from the top to the leaves (independent tasks) to produce sufficient independent subtree parallel tasks to balance the load across the number of desired parallel threads (cores). Load balancing can be determined by dividing the largest among the subtree tasks (initially one—the whole tree) into independent subtree tasks and distributing the largest among subtree tasks among the number of processing cores desired. This process can be repeated until the desired load balancing goal is met and then resulting subtree tasks can be scheduled into a single queue of subtree tasks. The remaining tasks from the tree root to the subtree 1404 tasks define the supernode portion of the tree structure. Supernode 1402 tasks may not be statically scheduled.

The second scheduling phase can be completely dynamic. In dynamic scheduling, each idle thread pulls a task from the initially full subtree task queue. Once completed, the dynamic scheduling will check if the immediate parent supernode task has satisfied all the dependencies to schedule the immediate parent supernode task in the initially emptied supernode task queue. The following idle threads check each queue for available tasks until all subtree tasks and supernode tasks can be completed. Communication between task types occurs implicitly through the dynamic task scheduling.

Figure 13:
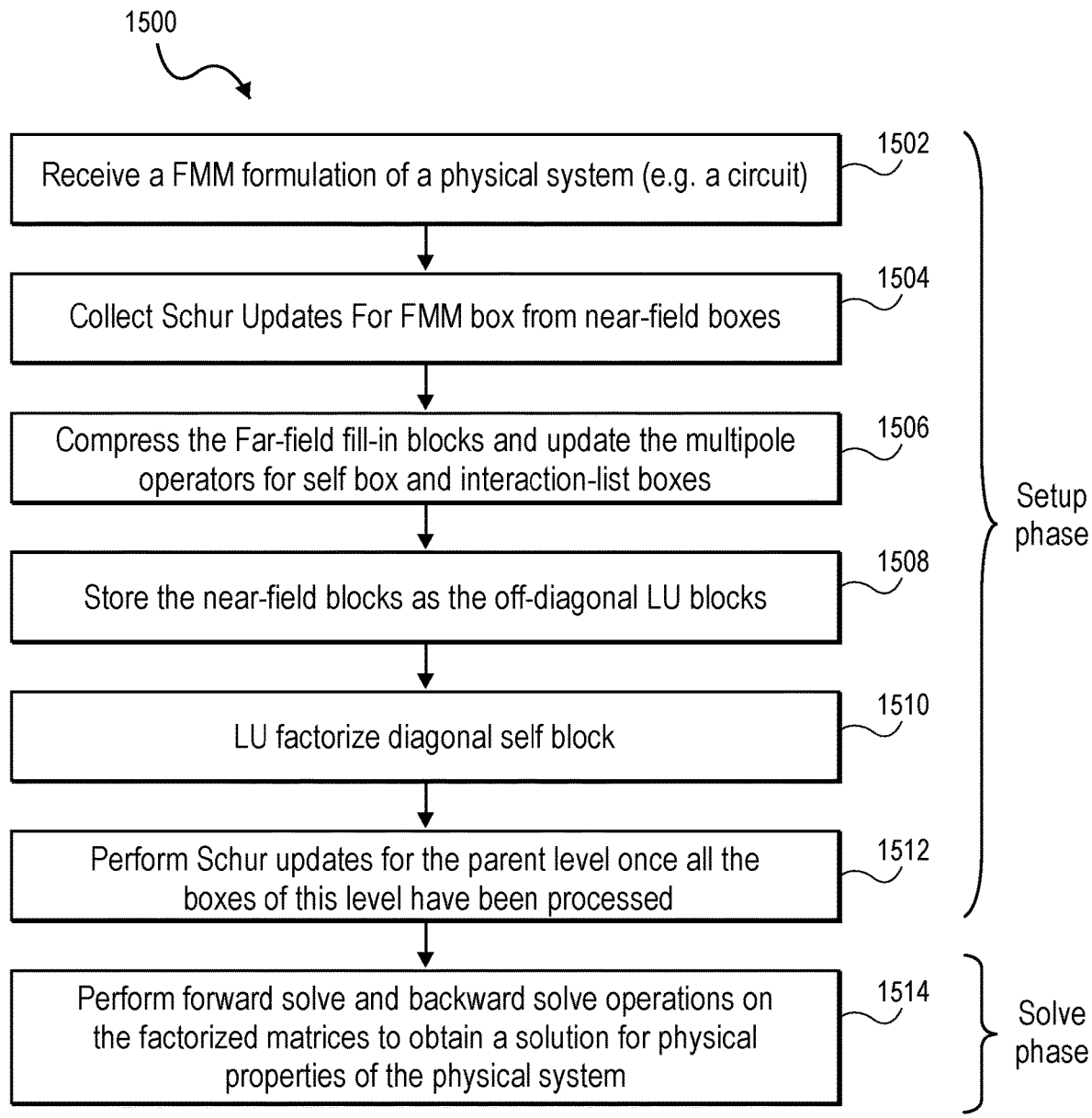
FIG. 13 is a flow chart which illustrates one embodiment of a process to obtain a solution for physical properties of a system according to an embodiment.

FIG. 13 shows an example of one embodiment of a process 1500 to obtain a solution for physical properties of a system. In one embodiment, the process 1500 can be divided into setup phase and solve phase. The embodiment of setup phase includes an operation 1502 in which a FMM formulation of a physical system, such as a circuit, can be received. Then, Schur updates for the box from near-fields can be collected in operation 1504. In operation 1506, the far-field fill-in blocks can be compressed and the multipole operators for self box and interaction-list boxes can be updated. The near-field blocks can be stored as the off-diagonal LU blocks in operation 1508. Following the operation 1508, the diagonal self block can be LU factorized in operation 1510. In the last step in the setup phase, Schur update for the parent level can be performed once all the boxes of this level have been processed in operation 1512.

In one embodiment, the solve phase includes an operation 1514 in which forward solve and backward solve operations can be performed on the factorized matrices to obtain a solution for physical properties of the physical system.

The process 1500 can be non-recursive in nature and can be performed in a parallel manner based on well-developed sparse matrix techniques. For example, Q2M or L2P operators can be modified only once while eliminating that particular box. The M2L operators for a particular level can be modified only once after the elimination of all the boxes of that level has been completed. Each far-field operator, namely Q2L or M2P generated during factorization can be updated at most once.

In addition, each multipole operator in the process 1500 can be updated only once in the operation 1506 without wasting processing resources in multiple or repeated operator updates. Further, only two SVDs may be required for each box. Because the operation of updating each multipole operator can be the most expensive operation in the process 1500, the time spent or resource required in the process 1500 can be minimized.

In one embodiment, memory allocation or known as malloc required in each box in the process 1500 can be limited to no more than two to speed up the processing speed and/or reduce resource requirements. Repeated malloc per box can incur signification memory overhead. The mechanism in the process 1500 can provide an error-controllable and linear memory mechanism (e.g., with required memory usage scaled linearly with problem size) which can be adopted within a sparse direct solver framework.

The methods and systems described herein may be implemented using any suitable processing system with any suitable combination of hardware, software and/or firmware, such as described below with reference to the non-limiting examples of FIGS. 14, 15A, 15B, and 15C.

Figure 14:
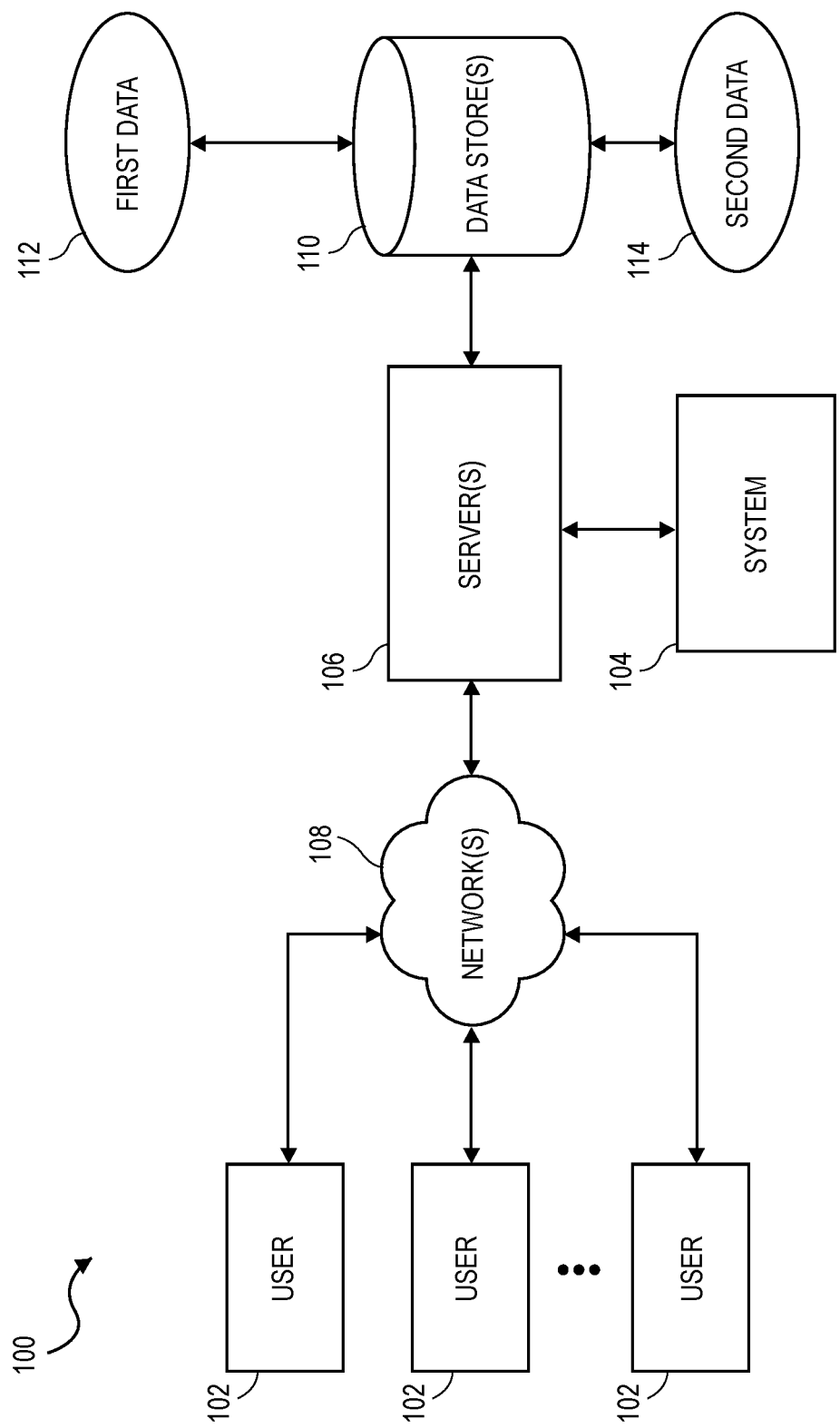
FIGS. 14, 15A, 15B, and 15C show example systems for implementing system and methods described herein.

FIG. 14 shows an example of a computer-implemented environment 100, which may be used with systems and methods described herein. For example, users 102 may interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

Figure 15A:
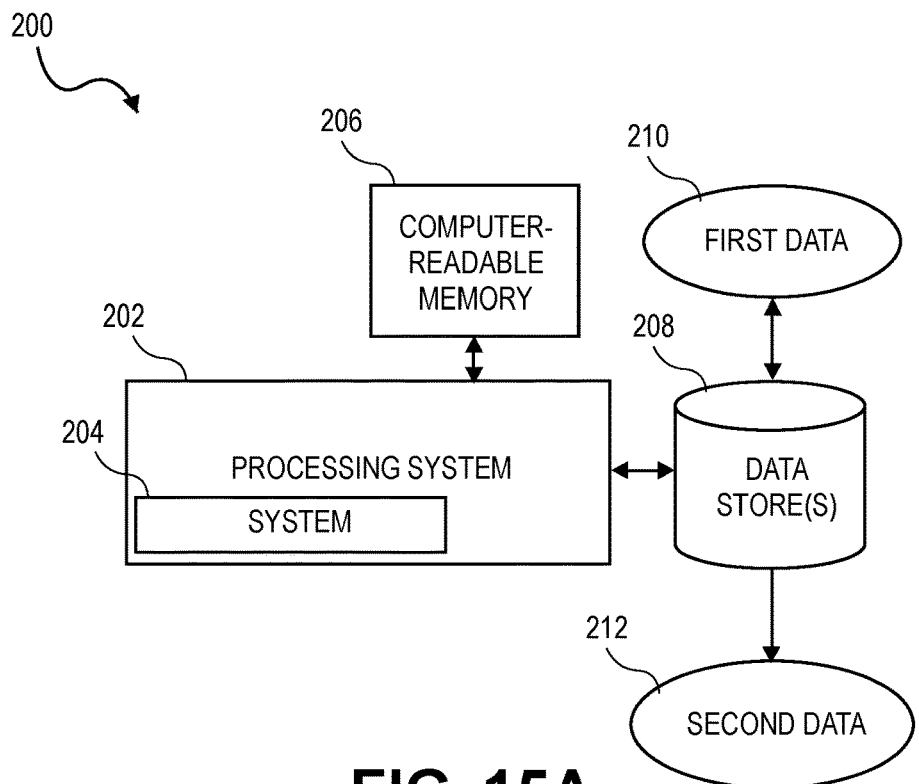
Figure 15B:
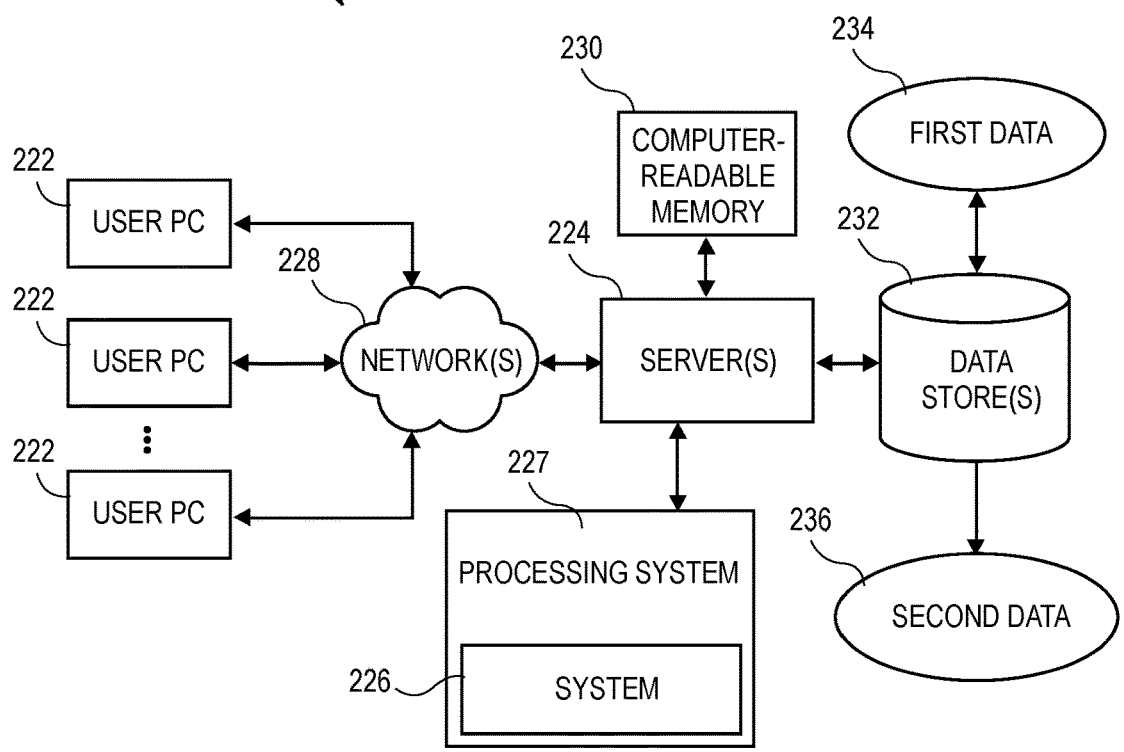
Figure 15C:
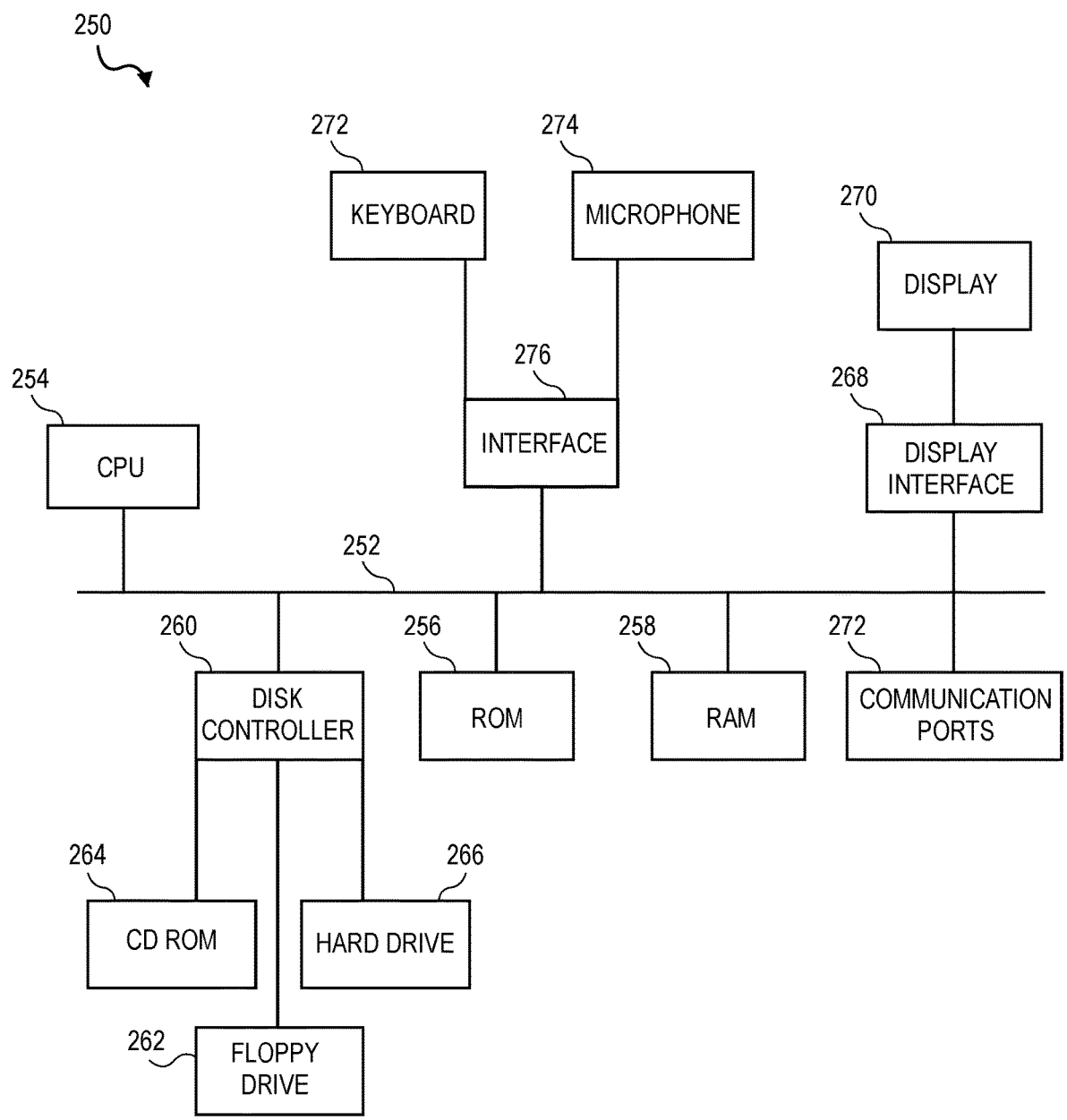

FIGS. 15A, 15B, and 15C show example systems for implementing the system and methods described herein. For example, FIG. 15A shows an exemplary system 200 that includes a standalone computer architecture where a processing system 202 (e.g., one or more computer processors) includes a system 204 being executed on it. The processing system 202 has access to a non-transitory computer-readable memory 206 in addition to one or more data stores 208. The one or more data stores 208 may contain first data 210 as well as second data 212.

FIG. 15B depicts a system 220 that includes a client server architecture. One or more user PCs 222 accesses one or more servers 224 running a system 226 on a processing system 227 via one or more networks 228. The one or more servers 224 may access a non-transitory computer readable memory 230 as well as one or more data stores 232. The one or more data stores 232 may contain first data 234 as well as second data 236.

FIG. 15C shows a block diagram of exemplary hardware for a standalone computer architecture 250, such as the architecture depicted in FIG. 14, that may be used to contain and/or implement the program instructions of system embodiments of the present invention. A bus 252 may serve as the information highway interconnecting the other illustrated components of the hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse, touchscreen and/or joystick.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A computer-implemented method for use in a solver, the method comprising:
    performing a setup phase, by the solver, based on left-looking incomplete inverse fast multipole (LL-IFMM) operation on matrix A, the matrix A representing a simulated physical system; and
    calculating a matrix-vector product for the matrix A, by the solver, based on a forward and backward substitution (FBS) method, the calculation of the matrix-vector product defining a solve phase.

2. The method of claim 1, the left-looking incomplete inverse fast multipole (LL-IFMM) operation including:
    preparing the matrix A in a predefined FMM hierarchical structure;
    for each of a plurality of FMM boxes at a predefined level in the FMM hierarchical structure, receiving a Schur complement from one or more factorized near-field FMM boxes, the receiving of the Schur complement generating a plurality of near-field fill-in blocks and a plurality of far-field fill-in blocks;
    compressing the plurality of far-field fill-in blocks and storing the plurality of far-field fill-in blocks to one or more predefined locations in the FMM hierarchical structure; updating a plurality of FMM operators associated with each of the plurality of FMM boxes and one or more far-field FMM boxes;
    storing the plurality of near-field fill-in blocks as a plurality of off-diagonal LU blocks;
    determining L factor and U factor based on LU factorization algorithm for each of the plurality of FMM boxes; and
    updating Schur complements for each of the plurality of FMM boxes belonging to a next predefined level in the FMM hierarchical structure once all of the plurality of FMM boxes at the predefined level in the FMM hierarchical structure have been processed.

3. The method of claim 2, the generated far-field fill-in blocks including (i) first type being formed between one or more eliminated FMM boxes and one or more FMM pivot boxes, and (ii) second type being formed between one or more non-eliminated FMM boxes and the one or more FMM pivot boxes.

4. The method of claim 2, wherein a memory allocation for each of the plurality of FMM boxes is no more than two mallocs, the mallocs being used to store near-field factors and far-field operators, thereby reducing processing speed and resource requirements.

5. The method of claim 2, wherein the update of each of the plurality of FMM operators includes a single update.

6. The method of claim 1, a parallelization of the setup phase and the solve phase based at least in part on an elimination tree method, the elimination tree method including:
    defining an adjacency graph for a current level; and
    performing nested-dissection of the adjacency graph based at least on graph partitioning algorithm to generate bi-partitioned tree for the current level, the generated bi-partitioned defining an elimination tree for the current level.

7. The method of claim 6, the parallelization of the setup phase and the solve phase being implemented using hybrid scheduling, the hybrid scheduling including (i) a static scheduling and a dynamic scheduling, and (ii) the dynamic scheduling.

8. The method of claim 7, wherein the static scheduling includes one or more supernode tasks and one or more subtree tasks, the one or more supernode tasks and the one or more subtree tasks being organized based on the elimination tree method.

9. A computer-implemented system for implementing a solver, comprising:
    a user interface coupled to an input/output device;
    a memory storing instructions; and
    one or more processors coupled to the user interface and the memory, the one or more processors executing the instructions from the memory, the one or more processors configured to perform a method including:
        performing a setup phase, by the solver, based on left-looking incomplete inverse fast multipole (LL-IFMM) operation on matrix A, the matrix A representing a simulated physical system; and
        calculating a matrix-vector product for the matrix A, by the solver, based on a forward and backward substitution (FBS) method, the calculation of the matrix-vector product defining a solve phase.

10. The computer-implemented system of claim 9, the left-looking incomplete inverse fast multipole (LL-IFMM) operation including:
    preparing the matrix A in a predefined FMM hierarchical structure;
    for each of a plurality of FMM boxes at a predefined level in the FMM hierarchical structure, receiving a Schur complement from one or more factorized near-field FMM boxes, the receiving of the Schur complement generating a plurality of near-field fill-in blocks and a plurality of far-field fill-in blocks;
    compressing the plurality of far-field fill-in blocks and storing the plurality of far-field fill-in blocks to one or more predefined locations in the FMM hierarchical structure; updating a plurality of FMM operators associated with each of the plurality of FMM boxes and one or more far-field FMM boxes;
    storing the plurality of near-field fill-in blocks as a plurality of off-diagonal LU blocks;
    determining L factor and U factor based on LU factorization algorithm for each of the plurality of FMM boxes; and
    updating Schur complements for each of the plurality of FMM boxes belonging to a next predefined level in the FMM hierarchical structure once all of the plurality of FMM boxes at the predefined level in the FMM hierarchical structure have been processed.

11. The computer-implemented system of claim 10, the generated far-field fill-in blocks including (i) first type being formed between one or more eliminated FMM boxes and one or more FMM pivot boxes, and (ii) second type being formed between one or more non-eliminated FMM boxes and the one or more FMM pivot boxes.

12. The computer-implemented system of claim 10, wherein a memory allocation for each of the plurality of FMM boxes is no more than two mallocs, the mallocs being used to store near-field factors and far-field operators, thereby reducing processing speed and resource requirements.

13. The computer-implemented system of claim 10, wherein the update of each of the plurality of FMM operators includes a single update.

14. The computer-implemented system of claim 9, a parallelization of the setup phase and the solve phase based at least in part on an elimination tree method, the elimination tree method including:
defining an adjacency graph for a current level; and
performing nested-dissection of the adjacency graph based at least on graph partitioning algorithm to generate bi-partitioned tree for the current level, the generated bi-partitioned defining an elimination tree for the current level.

15. The computer-implemented system of claim 14, the parallelization of the setup phase and the solve phase being implemented using hybrid scheduling, the hybrid scheduling including (i) a static scheduling and a dynamic scheduling, and (ii) the dynamic scheduling.

16. The computer-implemented system of claim 15, wherein the static scheduling includes one or more supernode tasks and one or more subtree tasks, the one or more supernode tasks and the one or more subtree tasks being organized based on the elimination tree method.

17. A non-transitory computer-readable memory storing instructions for commanding one or more processors to perform a method for use in a solver, the method comprising:
performing a setup phase, by the solver, based on left-looking incomplete inverse fast multipole (LL-IFMM) operation on matrix A, the matrix A representing a simulated physical system; and
calculating the matrix-vector product for the matrix A, by the solver, based on a forward and backward substitution (FBS) method, the calculation of the matrix-vector product defining a solve phase.

18. The non-transitory computer-readable memory of claim 17, the left-looking incomplete inverse fast multipole (LL-IFMM) operation including:
preparing the matrix A in a predefined FMM hierarchical structure;
for each of a plurality of FMM boxes at a predefined level in the FMM hierarchical structure, receiving a Schur complement from one or more factorized near-field FMM boxes, the receiving of the Schur complement generating a plurality of near-field fill-in blocks and a plurality of far-field fill-in blocks;
compressing the plurality of far-field fill-in blocks and storing the plurality of far-field fill-in blocks to one or more predefined locations in the FMM hierarchical structure; updating a plurality of FMM operators associated with each of the plurality of FMM boxes and one or more far-field FMM boxes;
storing the plurality of near-field fill-in blocks as a plurality of off-diagonal LU blocks;
determining L factor and U factor based on LU factorization algorithm for each of the plurality of FMM boxes; and
updating Schur complements for each of the plurality of FMM boxes belonging to a next predefined level in the FMM hierarchical structure once all of the plurality of FMM boxes at the predefined level in the FMM hierarchical structure have been processed.

19. The non-transitory computer-readable memory of claim 18, the generated far-field fill-in blocks including (i) first type being formed between one or more eliminated FMM boxes and one or more FMM pivot boxes, and (ii) second type being formed between one or more non-eliminated FMM boxes and the one or more FMM pivot boxes.

20. The non-transitory computer-readable memory of claim 18, wherein a memory allocation for each of the plurality of FMM boxes is no more than two mallocs, the mallocs being used to store near-field factors and far-field operators, thereby reducing processing speed and resource requirements.

21. The non-transitory computer-readable memory of claim 17, a parallelization of the setup phase and the solve phase based at least in part on an elimination tree method, the elimination tree method including:
defining an adjacency graph for a current level; and
performing nested-dissection of the adjacency graph based at least on graph partitioning algorithm to generate bi-partitioned tree for the current level, the generated bi-partitioned defining an elimination tree for the current level.

22. The non-transitory computer-readable memory of claim 21, the parallelization of the setup phase and the solve phase being implemented using hybrid scheduling, the hybrid scheduling including (i) a static scheduling and a dynamic scheduling, and (ii) the dynamic scheduling.

23. The non-transitory computer-readable memory of claim 22, wherein the static scheduling includes one or more supernode tasks and one or more subtree tasks, the one or more supernode tasks and the one or more subtree tasks being organized based on the elimination tree method.

* * * * *